US006563916B1

United States Patent
Deutsch et al.

(10) Patent No.: US 6,563,916 B1
(45) Date of Patent: *May 13, 2003

(54) SYSTEM FOR TRANSMITTING A CHANGE IN CALL QUEUED/HOLD STATE ACROSS A COMMUNICATIONS NETWORK

(75) Inventors: Douglas Anthony Deutsch, Aurora, IL (US); Donald Robert Rueckheim, Lockport, IL (US); David B. Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/334,207

(22) Filed: Jun. 15, 1999

Related U.S. Application Data (63) Continuation-in-part of application No. 09/111,841, filed on Jul. 8, 1998.

(51) Int. Cl.[7] ................................................. H04M 3/42
(52) U.S. Cl. ................... 379/215.01; 379/162; 379/393
(58) Field of Search .............................. 379/215, 393, 379/201, 162

(56) References Cited

U.S. PATENT DOCUMENTS

| | | | | |
|---|---|---|---|---|
| 5,668,861 A | * | 9/1997 | Watts ..................... | 379/208 X |
| 5,764,746 A | * | 6/1998 | Reichelt ................. | 379/162 X |
| 5,875,231 A | * | 2/1999 | Farfan et al. ........... | 379/293 X |
| 6,031,905 A | * | 2/2000 | Furman et al. ............. | 379/201 |
| 6,118,861 A | * | 12/2000 | Gutzmann et al. .......... | 379/215 |

* cited by examiner

Primary Examiner—Creighton Smith
(74) Attorney, Agent, or Firm—Patton Boggs, LLP

(57) ABSTRACT

The system for transmitting a change in call queued/hold state across a communications network (termed "call state notification system" herein) functions to provide an indication to the parties on the existing call connection that the calling party has placed the call on hold and/or the call center has advanced the call connection to the head of the queue for connection to an agent. This is accomplished by enabling the calling party to place their call termination on hold to serve another call or to perform some other task without having to physically monitor the call connection. When the calling party removes the hold state at their terminal device, the call center receives a notification of the reconnection of the calling party to the call connection. In addition, when the call center advances the call connection to the head of the queue, the call state notification system notifies the calling party and, if the call connection is on hold, the call center maintains the calling party's position at the head of the queue until the calling party returns to the call connection.

28 Claims, 4 Drawing Sheets

SYSTEM FOR TRANSMITTING A CHANGE IN CALL QUEUED/HOLD STATE ACROSS A COMMUNICATIONS NETWORK

CROSS REFERENCE TO RELATED APPLICATIONS

This application is a continuation-in-part of an application titled "CALL HOLD STATE NOTIFICATION ACROSS A COMMUNICATIONS NETWORK", filed on Jul. 8, 1998 as U.S. patent application Ser. No. 09/111,841.

FIELD OF THE INVENTION

This invention relates to call center systems and, in particular, to a method and apparatus that provides a notification to all parties on an existing call connection, between a calling party and the call center, of changes in the hold state and/or queued status of the call connection.

Problem

It is a problem in the field of call center systems that when an incoming call is received at the call center and all agents are presently occupied, the incoming call is placed on hold in a queue and the calling party must remain on the line to monitor the held state of the call connection. If the calling party places their end of the call connection on hold, the call center is not aware of this call hold status and when the call center extends the call connection to an available agent, the agent does not realize that the calling party has placed the call connection on hold and likely believes that the call connection has been dropped. The agent then disconnects the call and the calling party must reinitiate a call connection to the call center and be placed at the beginning of the queue. In addition, if the call center transmits an announcement to the calling party regarding the queued state of the call, this information is not conveyed to the calling party since the call connection is on hold at the calling party's end of the call connection.

Therefore, the present implementation of two-way communication connections between a calling party and a call center can be frustrating to both the calling party, since they are captive to the call connection and must remain idle for the duration of the call queue condition, as well as the call center agent who believes that the call connection has been dropped when they encounter a call placed on hold by a calling party. There is presently no system that addresses these call center call queuing problems or conveys call status information to the parties when the calling party places the call on hold.

Solution

The above described problems are solved and a technical advance achieved by the present system for transmitting a change in call queued/hold state across a communications network (termed "call state notification system" herein) that functions to provide an indication to the parties on the existing call connection that the calling party has placed the call on hold and/or the call center has advanced the call connection to the head of the queue for connection to an agent. This is accomplished by enabling the calling party to place their call termination on hold to serve another call or to perform some other task without having to physically monitor the call connection. When the calling party removes the hold state at their terminal device, the call center receives a notification of the reconnection of the calling party to the call connection. In addition, when the call center advances the call connection to the head of the queue, the call state notification system notifies the calling party and, if the call connection is on hold, the call center maintains the calling party's position at the head of the queue until the calling party returns to the call connection.

The held state determination is performed by the communications system in the communications network that serves the calling party and the call queued status is determined by the call center. The information regarding the queued/held state of the call connection is typically communicated via out-of-band signaling among the various communications systems in the communications network that serve the call connection. The communication system that serves the calling party transmits call hold state data to the call center while the call center and/or the communication system serving the call center transmits data to the communication system that serves the calling party regarding the call queued status of the call connection.

Furthermore, the use of this feature is extensible to data communications connections, multi-media connections, as well as the use of various communications network architectures, including the Internet, Public Switched Telephone Network (PSTN), inter-exchange carriers, and the like.

DETAILED DESCRIPTION

Communications Network with Call State Notification System

Figure 1:
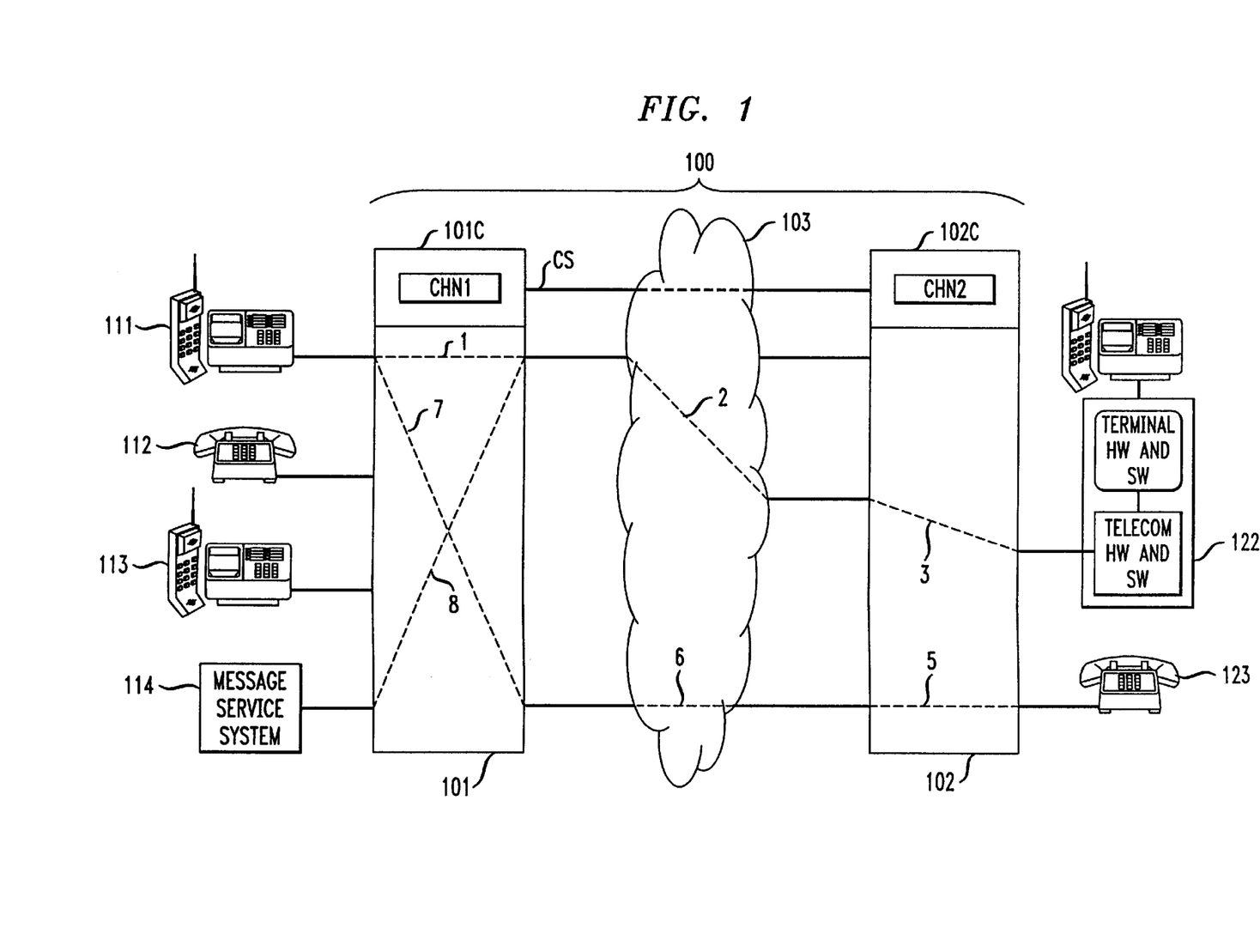
FIG. 1 illustrates in block diagram form the architecture of a typical communications network that is equipped with the present call state notification system.
Figure 2:
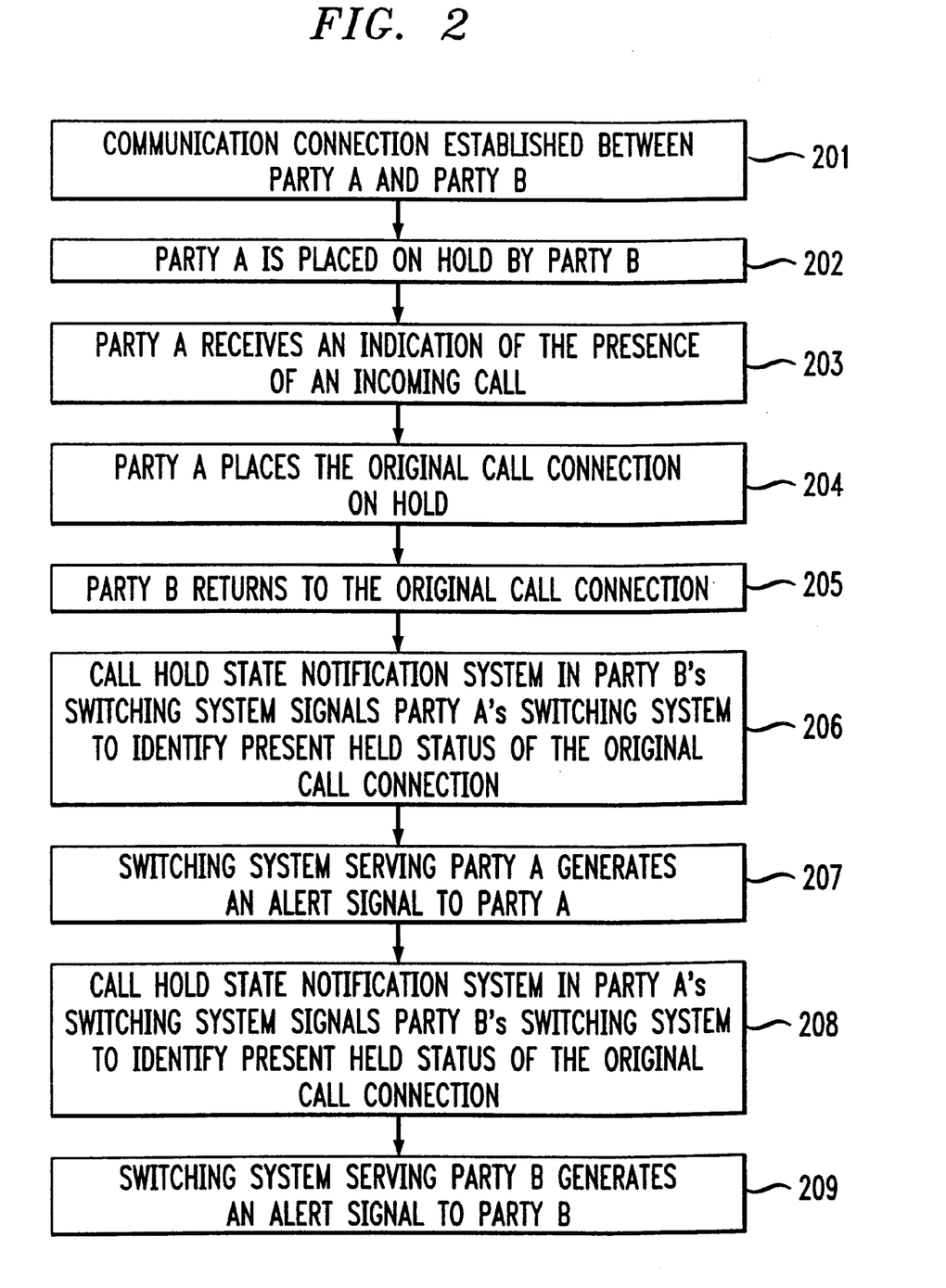
FIG. 2 illustrates in flow diagram form the operation of the present call state notification system in a typical communications network.

FIG. 1 illustrates in block diagram form the architecture of a typical communications network that is equipped with the present call state notification system while FIG. 2 illustrates in flow diagram form the operation of the present call state notification system in that communications network. In particular, the communications network comprises a traditional voice communications network that includes a plurality of local communications systems 101–102, such as telephone switching systems that are part of the Public Switched Telephone Network (PSTN) 100 and are interconnected via trunk circuits to an Interexchange Carrier System (IXC) 103. Each of the communications systems 101, 102 serve a plurality of terminal devices and the communications systems 101, 102 may be interconnected via an out of band signaling link CS through the Interexchange Carrier System (IXC) 103, using the well known SS7 signaling protocol. The operation of such a communications network is well known and is not described in detail herein. The communications systems 101, 102 provide a set of features and services to the terminal devices that they serve, including a call hold service wherein the communications systems 101, 102 implement the call hold function for the associated terminal devices in response to control signals that are received from the terminal devices. In addition, the communications systems 101, 102 are both equipped with the call state notification systems CHN1, CHN2, that are operational in the controllers 101C, 102C of the respective communications systems 101, 102.

Call Hold Notification Example

In order to illustrate the operation of the present call state notification system, an example of a typical call connection is described, in flow diagram form in FIG. 2, with respect to the system architecture of FIG. 1. In particular, the call connection is from a calling party, Party A located at terminal device 111 (such as a telephone station set) and a communications system that has the ability to queue incoming calls for service, such as a call center 122. The call center functions to interconnect a plurality of calling parties with customer service agents who provide service to the calling parties. It is typical that the number of incoming calls at any point in time exceeds the capacity of the agents to process. The call center 122 therefore places the incoming calls into a queue, to typically be served on a first come first served basis. The queued calls move up in the queue from the bottom or entry point of the queue to the top of the queue as previously received incoming calls are serviced. When the incoming call reaches the top of the queue, the call center extends this incoming call to the next available agent for processing. If the calling party hangs up while waiting in queue, the calling party loses their priority and must reenter the queue at the bottom if the calling party again calls the call center 122.

This process is typically initiated at step 201, when a communication connection is established between the calling party, Party A, located at terminal device 111 (such as a telephone station set), and call center 122. This is accomplished for example by Party A at terminal device 111 going off hook and dialing the telephone number of call center 122. In response to the dialed digits, the controller 101C of communications system 101 causes a call connection to be extended over path 1 to the Interexchange Carrier System 103, which, in response to control signals received from controller 101C over control channel CS, extends this call connection over path 2 to communications system 102. The control signals originated by the controller 101C are propagated by the Interexchange Carrier System 103 to the controller 102C of communications system 102. The controller 102C responds to the received control signals by further extending the call connection over path 3 to the call center 122.

If the call center 122 does not have an available agent, the call center 122 transmits a prerecorded message to Party A indicating the need to wait in Queue until an available agent can handle the call. The call connection from Party A is then placed on hold by call center 122 at step 202. This is accomplished by call center 122 signaling controller 102C of communications system 102 to activate the call hold function so that the call connection is held in the communication system 102. The controller 102C implements the call hold function, placing the call connection from terminal device 111 over paths 1 and 2 in an active but noncommunicating condition, thereby freeing call center 122 to originate and receive additional call connections. Alternatively, the call connection can be held in the call center 122, but this occupies additional physical facilities to connect call center 122 to the communications system 102 and it is preferable to manage the call hold function in the communications system 102. This alternative would envision the use of the call hold function of controller 102C being implemented in call center 122, but for simplicity of description, the use of the call hold function in controller 102C is described herein.

Assume that while on hold, Party A receives an indication at terminal device 111 at step 203 from communications system 101 of the presence of an incoming call that is directed to Party A. Assume that this new incoming telephone call (path segments 5–7) is from Party C, located at terminal device 123 and Party A wishes to answer the incoming call while still on hold on the original call connection. However, Party A does not wish to lose their place in the queue in call center 122. The present system enables the Party A to maintain their call connection to call center 122 and keep their place in the queue while being able to process another call connection. To receive the incoming call from Party C, Party A at step 204 activates terminal device 111 to signal the controller 101C of communications system 101 to place the original call connection with call center 122 on hold and thereby enable Party A to answer the incoming call from Party C. As a result, the original call connection between Party A and call center 122 is in an on hold state in both communications systems 101, 102 that serve Party A and call center 122, respectively. The call hold state notification system CHN2 in controller 102C stores the data indicative of the call hold state and optionally signals the call center 122 that the calling party, Party A, has placed the call connection on hold. Call center 122 responds to this signal by maintaining Party A in queue as if the call connection was available.

When call center 122 determines that an agent is available to service the call connection to Party A, call center 122 returns to the original call connection at step 205 and signals controller 102C to release the call hold condition on the original call connection and restore the connection to call center 122 via path 3. However, Party A is not present because Party A is communicating with Party C on the second call connection. In order to make Party A aware of the return of call center 122 to the original call connection, the present call state notification system CHN2 at step 206 generates an alert signal to identify the present held status of the original call connection. In particular, the communications system 102 that serves call center 122 activates the call state notification system CHN2 to transmit an indication to the controller 101C of communications system 101 that serves Party A to indicate the return to the original call connection by call center 122. The controller 101C of communications system 101 serving Party A, in response of receipt of this indication from the call state notification system CHN2, generates an alert signal at step 207 and transmits it to Party A to alert Party A that call center 122 requests reconnection or has reconnected to the original call connection. The message exchange between the two communications systems 101, 102 can be accomplished by out-of-band signaling, such as the SS7 protocol, or by means of in-band signaling on the original call connection. The call center 122 can maintain an agent available to process the call from Party A, or may simply provide this call with access to the next available agent when Party A reconnects to the call connection.

If the Party A is equipped with a feature rich communication device 111, then there are a number of call handling options that are available at this juncture. Party A may drop the call connection to Party C and return to the original call connection with call center 122. Alternatively, Party A can place the call connection with Party C on hold, while returning to the original call connection with call center 122. Party A can also drop or conference the call connection with call center 122 or can send the call connection to a message system 114, such as voice mail, over path 8. These options enable Party A to manage the call connection in response to changing circumstances occasioned by the receipt of the new call connection from Party C.

In the processing of the change of hold state of the call connection by call center 122, the call state notification system CHN1 resident in the controller 101C of communications system 101 can produce an indication that can be provided to call center 122 when call center 122 returns to the original call connection to indicate that Party A has placed the original call connection on hold. This is accomplished by the call state notification system CHN1 resident in communications system 101, in response to the indication received from call state notification system CHN2 of communications system 102 that call center 122 has reconnected to the original call connection, broadcasting a prerecorded message on the original call connection to call center 122 to inform call center 122 of the present hold state of the original call connection due to Party A's actions. The call center 122 can either hold Party A at the head of the queue until Party A returns to the call connection, or can periodically retry to connect Party A to the call center agent.

ISP Communications Network with Call State Notification System

Figure 3:
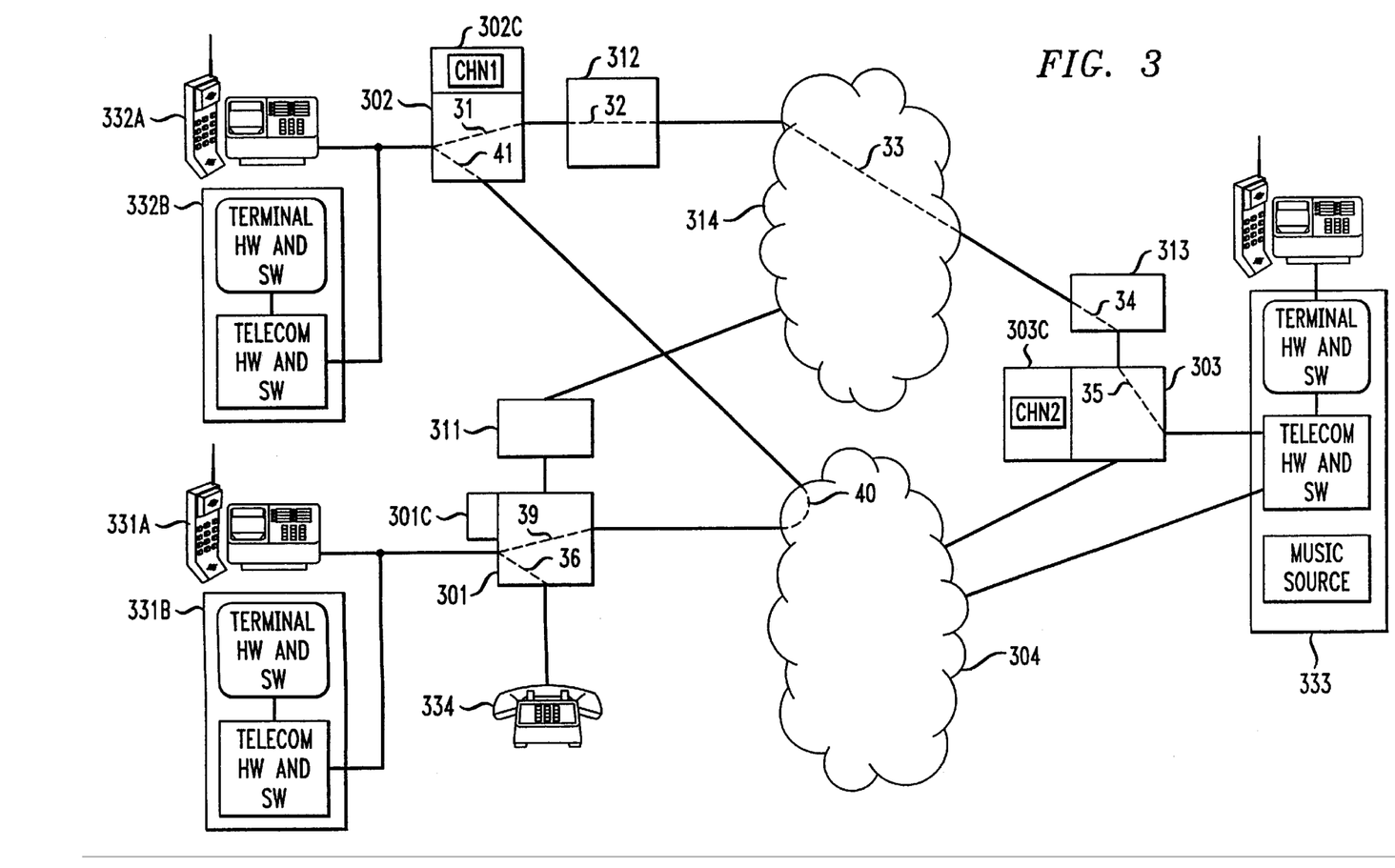
FIG. 3 illustrates in block diagram form the architecture of a typical communications network that is equipped with the call state notification system and that is connected to an Internet Service Provider communications network.
Figure 4:
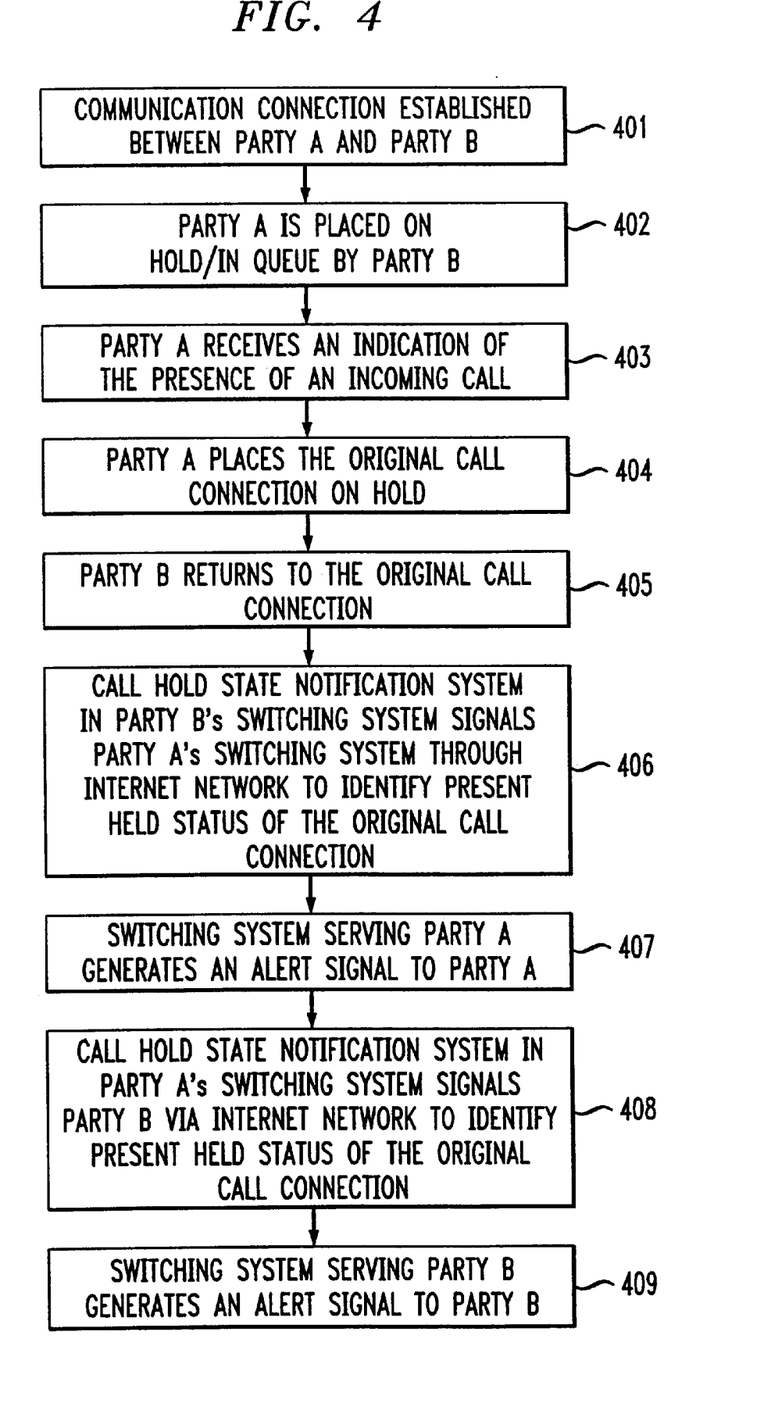
FIG. 4 illustrates in flow diagram form the operation of the present call state notification system in a typical communications network that is equipped with the call state notification system and that is connected to an Internet Service Provider communications network.

FIG. 3 illustrates in block diagram form the architecture of a typical combination of a Public Switched Telephone Network (PSTN) and an Internet Service Provider communications network that is equipped with the present call state notification system while FIG. 4 illustrates in flow diagram form the operation of the present call state notification system CHN2 in that communications network. In particular, the communications network comprises a traditional voice communications network that includes a plurality of communications systems 301–303, such as the local communications systems that are part of the Public Switched Telephone Network (PSTN) and are interconnected via trunk circuits to an Interexchange Carrier System (IXC) 304. Each of the communications systems 301–303 serve a plurality of telephone stations and the communications systems 301–303 may be interconnected via an out of band signaling link CS through the Interexchange Carrier System (IXC) 304, using the well known SS7 signaling protocol. The operation of such a communications network is well known and is not described in detail herein. The communications systems 301–303 provide a set of features and services to the terminal devices that they serve, including a call hold service wherein the communications systems 301–303 implement the call hold function for the associated terminal devices in response to control signals that are received from the terminal devices. In addition, the communications systems 301–303 are all equipped with the call state notification systems, that are operational in the controllers 301C–303C of the respective communications systems 301–303, as described above. The Internet Service Provider communications network comprises a data communications network 314 that interconnects a plurality of Internet Service Providers 311–313, each of which serves a plurality of subscribers. The subscribers are connected to the Internet Service Providers 311–313 via local communications systems 301–303 in well known fashion.

The subscriber at one of the terminal devices 332A, equipped with a personal computer 332B, can place a telephone call to another subscriber, at terminal device 332A, equipped with a personal computer 332B, via the Internet data communications network. This enables the subscriber to place a local telephone call through the local communications system 302 to the Internet Service Provider 312 and thence, without paying long distance toll charges, to the other subscriber. Thus, the Internet data communications network 314 performs the function of the Interexchange Carrier 304.

Call Hold Notification Example

In order to illustrate the operation of the present call state notification system, an example of a typical call connection is described, in flow diagram form in FIG. 4, with respect to the system architecture of FIG. 3.

In particular, at step 401, a communication connection is established between Party A, located at terminal device 332A, and a communications system that has the ability to queue incoming calls for service, such as a call center 333. This is accomplished for example by Party A at terminal device 332A going "off hook" and dialing the telephone number of the Internet Service Provider via the telcom hardware and software that is resident in Party A's personal computer 332B. In response to the dialed digits, the controller 302C of communications system 302 causes a call connection to be extended over path 31 to the Internet Service Provider System 312, which, in response to control signals received from Party A via personal computer 332B that identify call center 333, extends this call connection over path 32 to data communications network 314. This communication connection is advanced by data communications network 314 over path 33 to Internet Service Provider System 313. Internet Service Provider extends this call connection over path 34 by initiating a call connection to communications system 303, where path 35 completes the call connection to the call center 333, or, if there is an existing data communication link between call center 333 and Internet Service Provider 313, Internet Service Provider 313 extend the call connection to call center 333 via this existing link.

If the call center 333 does not have an available agent, the call center 333 transmits a prerecorded message to Party A indicating the need to wait in queue until an available agent can handle the call. The call connection from Party A is then placed on hold/in queue by call center 333 at step 402 and communications system 303 maintains the call connection to the calling party. Call center 333 may provide music, announcements, on hold or other treatments to queued/held callers via premise based hardware 333M at the call center 333. The call center 333 maintains the calling party in queue to receive service as defined by the call center 333 until an agent becomes available. The call center 333 may also request input from the caller in lieu of connecting the caller to an agent. The call center 333 would use the present communication state of the connection to determine whether a prompt announcement should be played to the caller.

The music source 333M illustrated in FIG. 3 is representative of a number of services that may be offered through a generalized "resource server" to the callers who are placed on hold. Other services can be video on hold, advertising, stock feeds, or other information sources. In addition, music sources (alternatively "resource servers") can be distributed throughout the network. In a packet environment, providing these services in the network, as close to the calling party as possible, avoids transit delay, reduces packet traffic, thereby avoiding costs, and reduces the overall network congestion.

The signaling controller 303C for the communications system 303 can signal the calling party controller 301C to provide call treatment through the use of the nearest available network resource server, while the calling party is in queue and the call connection is maintained.

If the call is placed on hold, call center 333 signals controller 303C of communications system 303 to activate the call hold function. Controller 303C implements the call hold function, placing the call connection from terminal device 332A over paths 31–34 in an active but noncommunicating condition, thereby freeing terminal device 332A to originate and receive additional call connections. As part of this operation, communications system 303 must either maintain the call connection in a manner to prevent the call connection from being dropped by Internet Service Provider 313, or communicate with Internet Service Provider 313 to enable the data communication connection to Party A to be reestablished when necessary.

Assume that a new incoming telephone call (path segments 39–41) is received by Party A from Party C, located at terminal device 331A and Party A wishes to answer the incoming call while still on hold on the original call connection. To receive the incoming call from Party C, Party A at step 404 activates terminal device 332A to signal the controller 302C of communications system 302 to place the original call connection with call center 333 on hold (as described above) and thereby enable Party A to answer the incoming call from Party C. As a result, the original call connection between Party A and call center 333 is in an on hold state in both communications systems 302–303 that serve Party A and call center 333, respectively. Call center 333 responds to this signal by maintaining Party A in queue as if the call connection was still in a communicating mode. Prompting announcements could also be delayed until the call connection is again in a communicating mode. Thus, transmitting packets to terminal device 332A is unnecessary since the call connection is on hold and call state notification system CHN2 blocks all transmissions to terminal device 332A to conserve network resources, until there is a change in state of the call hold/in queue condition at the call center 333.

When call center 333 determines that an agent is available to service a call connection and Party A is at the head of the queue, call center 333 returns to the original call connection at step 405 and signals controller 302C to release the call hold condition on the original call connection and restore the connection to call center 333 via path 3. However, Party A is not present because Party A is communicating with Party C on the second call connection. In order to make Party A aware of the return of call center 333 to the original call connection, the call state notification system CHN2 located in communications system 303 at step 406 generates an alert signal to identify the present held status of the original call connection. In particular, the communications system 303 that serves call center 333 activates the call state notification system CHN2 to transmit an indication to the controller 302C of communications system 302 that serves Party A to indicate the return to the original call connection by call center 333. The controller 302C of communications system 302 serving Party A, in response of receipt of this indication from the call state notification system CHN2, generates an alert signal at step 407 and transmits it to Party A to alert Party A that call center 333 has reconnected to the original call connection. The message exchange between the two communications systems 302, 303 is accomplished by signaling through the Internet data connection, from communications system 303 to Internet Service Provider 313, via data communication network 314 to Internet Service Provider 312 to communications system 302.

If the Party A is equipped with a feature rich communications device 332A, then there are a number of call handling options that are available at this juncture. Party A may drop the call connection to Party C and return to the original call connection with call center 333. Alternatively, Party A can place the call connection with Party C on hold, while returning to the original call connection with call center 333. Party A can also drop or conference the call connection with call center 333 or can send the call connection to a message system, such as voice mail. These options enable Party A to manage the call connection in response to changing circumstances occasioned by the receipt of the new call connection from Party C.

In the processing of the change of hold state of the call connection by call center 333, the call state notification system resident CHN1 in the controller 302C of communications system 302 can produce an indication that can be provided to call center 333 when call center 333 returns to the original call connection to indicate that Party A has placed the original call connection on hold. This is accomplished by the call state notification system CHN1 resident in communications system 302, in response to the indication received from call state notification system of communications system 303 that call center 333 has reconnected to the original call connection, broadcasting a prerecorded message on the original call connection to call center 333 to inform call center 333 of the present hold state of the original call connection due to Party A's actions. The call center 333 can either hold Party A at the head of the queue until Party A returns to the call connection, or can periodically retry to connect Party A to the call center agent.

Additional Feature Capabilities

In the system described above, additional capabilities can be provided to enable the customers to vary the basic service package described above. Some of these variations include Hold Interrupt, wherein a party that was placed on hold can remove the remote hold condition from the call connection. An example of such a capability is where the call originating party has placed the call connection on hold and then returns to the call connection to discover that they have been placed on hold. In response to the indication of the hold state, this party can be provided with the option to respond by bridging or breaking into the call connection hold state that the other called party has established so that the original two parties to the call connection can communicate. Another variation of the above noted call hold notification process is to immediately provide the call originating party with an indication that the called party has placed the call connection on hold. The controllers may provide escape options to allow the queued/held calling party to leave voice mail in the subscriber (call center) mail box or in a network mail box to be delivered to the other subscriber (call center agent) when their communication device is idle. This option would not be available if party A had placed the call center 333 on hold. The called party controller may also allow escape for emergency treatments or redial. Alternatively, the call originating party can be provided with a feature that if their held call is in turn placed on hold by the held called party, the original call connection is automatically dropped, either immediately or after a predetermined wait period. As with these examples, the noted service can be provided not only to the call originating party but also to the called party or in an n-way conference to all or selected conferees.

Furthermore, in the case where the call state notification system advises the call center that the calling party has placed the call connection on hold, the call center can factor this fact in the processing of the call connection, for example, providing a reduced priority to this call connection or maintaining the call connection on hold for at least a predetermined period to ensure that the calling party is likely to be available when an agent is assigned to this call connection.

The above description notes the operation of the call state notification system to provide queuing and hold notification for voice calls. However, the queuing capability also applies to data and video calls. The difference with data calls is that the "calling party" transmits an E-Mail request for service to the service center. The E-Mail request is queued as any other request would be. This is purely a store and forward, packet transaction. There is no further expenditure of network resources until the agent at the call center is available to process the received E-Mail. When the queued request is dequeued to an agent, the agent typically responds with E-Mail to the calling party. While the E-Mail request is in queue, it may be considered "on hold". When the E-Mail reaches an agent, the controller 303C may connect the calling party with the agent via a real time data application, such as a chat room or video transmission. Thus, when the controller 303C is made aware of a change in state of the E-Mail "call", the controller 303C enables services that are analogous to the treatments that a voice caller receives.

Summary

The call state notification system enables the calling party to place their call termination on hold to serve another call or to perform some other task without having to lose their place in a call center queue. When the call center processes the held call to the head of the queue, the calling party receives a notification so they can reconnect to the call connection. The call connection of the reconnected calling party is then extended to the next available agent in the call center.

What is claimed:

1. A system for call hold state notification operational in a communications network, that enables a calling party, on a call connection through said communications network to a call center, to place said call connection in a hold state without losing their place in a queue in said call center, comprising:

means, responsive to said calling party placing said call connection in an on-hold state, for maintaining said call connection; and means, responsive to an indication that said call center has placed said call connection at a head of said queue, for signaling said calling party that said call center has placed said call connection at a head of said queue.

2. The system for call state notification of claim 1 further comprising:

means for transmitting data to said call center indicative of the on-hold status of said calling party.

3. The system for call state notification of claim 1 further comprising:

means, responsive to said call center placing said call connection at a head of said queue and said calling party removing said call connection from hold, for processing said call connection to completion to said call center.

4. The system for call state notification of claim 3 wherein said means for processing comprises:

means, responsive to said calling party returning to said call connection, for transmitting an indication of the return of said calling party to said call center.

5. The system for call state notification of claim 4 wherein said means for processing further comprises:

means, responsive to receipt of control signals from said call center, for maintaining said calling party on hold until receipt of further signaling from said call center to authorize extension of said communication connection to said call center.

6. The system for call state notification of claim 1 further comprising:

means for transmitting informational signals to said calling party while in an on hold state.

7. The system for call state notification of claim 6 wherein said means for transmitting comprises:

means, responsive to said call connection comprising a packet switched connection, for activating a source of informational signals located proximate said calling party to connect to said call connection to provide said informational signals.

8. The system for call state notification of claim 7 further comprising:

means, responsive to said calling party placing said call connection in an on-hold state, for signaling said source of informational signals to cease transmitting informational signals to said calling party while in an on hold state.

9. The system for call state notification of claim 7 further comprising:

means, responsive to said calling party placing said call connection in an on-hold state, for disabling transmitting informational signals to said calling party while in an on hold state.

10. The system for call state notification of claim 1 wherein said call connection comprises a data call, said means for signaling comprises:

means for transmitting an E-Mail message to said calling party via said call connection.

11. A method for call state notification operational in a communications network, that enables a calling party, on a call connection through said communications network to a call center, to place said call connection in a hold state without losing their place in a queue in said call center, comprising the steps of:

maintaining, in response to said calling party placing said call connection in an on-hold state, said call connection; and signaling, in response to an indication that said call center has placed said call connection at a head of said queue, said calling party that said call center has placed said call connection at a head of said queue.

12. The method for call state notification of claim 11 further comprising the step of:

transmitting data to said call center indicative of the on-hold status of said calling party.

13. The method for call state notification of claim 11 further comprising the step of:

processing, in response to said call center placing said call connection at a head of said queue and said calling party removing said call connection from hold, said call connection to completion to said call center.

14. The method for call state notification of claim 13 wherein said step of processing comprises:

transmitting, in response to said calling party returning to said call connection, an indication of the return of said calling party to said call center.

15. The method for call state notification of claim 12 wherein said step of processing further comprises:

maintaining, in response to receipt of control signals from said call center, said calling party on hold until receipt of further signaling from said call center to authorize extension of said communication connection to said call center.

16. The method for call state notification of claim 11 further comprising the step of:

transmitting informational signals to said calling party while in an on hold state.

17. The method for call state notification of claim 16 wherein said step of transmitting comprises:

activating, in response to said call connection comprising a packet switched connection, a source of informational signals located proximate said calling party to connect to said call connection to provide said informational signals.

18. The method for call state notification of claim 17 further comprising:

signaling, in response to said calling party placing said call connection in an on-hold state, said source of informational signals to cease transmitting informational signals to said calling party while in an on hold state.

19. The method for call state notification of claim 17 further comprising the step of:

disabling, in response to said calling party placing said call connection in an on-hold state, transmitting informational signals to said calling party while in an on hold state.

20. The method for call state notification of claim 11 wherein said call connection comprises a data call, said means for signaling comprises:

means for transmitting an E-Mail message to said calling party via said call connection.

21. A system for call state notification operational in a communications network, that enables a calling party, on a call connection through said communications network to a call center, to place said call connection in a hold state without losing their place in a queue in said call center, comprising:

communications controller means, responsive to said calling party placing said call connection in an on-hold state, for maintaining said call connection;

call state notification means, responsive to an indication that said call center has placed said call connection at a head of said queue, for signaling said calling party that said call center has placed said call connection at a head of said queue; and call processing means, responsive to said call center placing said call connection at a head of said queue and said calling party removing said call connection from hold, for processing said call connection to completion to said call center.

22. The system for call state notification of claim 21 wherein said call processing means comprises:

signaling means, responsive to said calling party returning to said call connection, for transmitting an indication of the return of said calling party to said call center.

23. The system for call state notification of claim 22 wherein said call processing means further comprises:

call connection maintaining means, responsive to receipt of control signals from said call center, for maintaining said calling party on hold until receipt of further signaling from said call center to authorize extension of said communication connection to said call center.

24. The system for call state notification of claim 21 further comprising:

information providing means for transmitting informational signals to said calling party while in an on hold state.

25. The system for call state notification of claim 24 wherein said means for transmitting comprises:

control means, responsive to said call connection comprising a packet switched connection, for activating a source of informational signals located proximate said calling party to connect to said call connection to provide said informational signals.

26. The system for call state notification of claim 25 further comprising:

signaling disabling means, responsive to said calling party placing said call connection in an on-hold state, for signaling said source of informational signals to cease transmitting informational signals to said calling party while in an on hold state.

27. The system for call state notification of claim 25 further comprising:

signaling disabling means, responsive to said calling party placing said call connection in an on-hold state, for disabling transmitting informational signals to said calling party while in an on hold state.

28. The system for call state notification of claim 21 wherein said call connection comprises a data call, said call state notification means comprises:

E-Mail signaling means for transmitting an E-Mail message to said calling party via said call connection.

* * * * *